United States Patent

Jacobs

[11] Patent Number: 6,044,672
[45] Date of Patent: Apr. 4, 2000

[54] STEERING WHEEL LOCK REMOVING METHOD

[76] Inventor: Justin Jacobs, 1125 Mission St., San Francisco, Calif. 94103

[21] Appl. No.: 09/371,865

[22] Filed: Jul. 27, 1999

[51] Int. Cl.[7] .................................................. B60R 25/02
[52] U.S. Cl. .............................................. 70/209; 70/465
[58] Field of Search ............................ 70/209–212, 237, 70/238, 225, 226, 465, 14; 29/426.4, 426.5; 408/72 R

[56] References Cited

U.S. PATENT DOCUMENTS

| | | | |
|---|---|---|---|
| 4,714,386 | 12/1987 | Phillips | 70/465 X |
| 5,918,488 | 7/1999 | Deeter | 70/14 |

*Primary Examiner*—Suzanne Dino Barrett
*Attorney, Agent, or Firm*—Goldstein & Canino

[57] ABSTRACT

A method for removing a steering wheel lock using a device having a main body having a center opening and a pair of supporting arms extending outwardly and downwardly. The device further comprises a central shaft extending through the center opening in the main body. The central shaft includes an externally threaded portion and a hook portion extending therefrom for grabbing the steering wheel lock. A crank arm having an internally threaded bore is rotatably mounted to the externally threaded portion of the central shaft. To remove a steering wheel lock from a steering wheel, the crank arm is manually rotated which advances the central shaft in an upward direction which in turn pulls at the grab point of the steering wheel lock while the supporting arms of the main body holds the remainder of the steering wheel lock in place, thereby bending the steering wheel lock. The steering wheel lock may be removed from the steering wheel when it either breaks, or is sufficiently bent to allow the hooks on the steering wheel lock to become disengaged from the rim of the steering wheel.

5 Claims, 2 Drawing Sheets

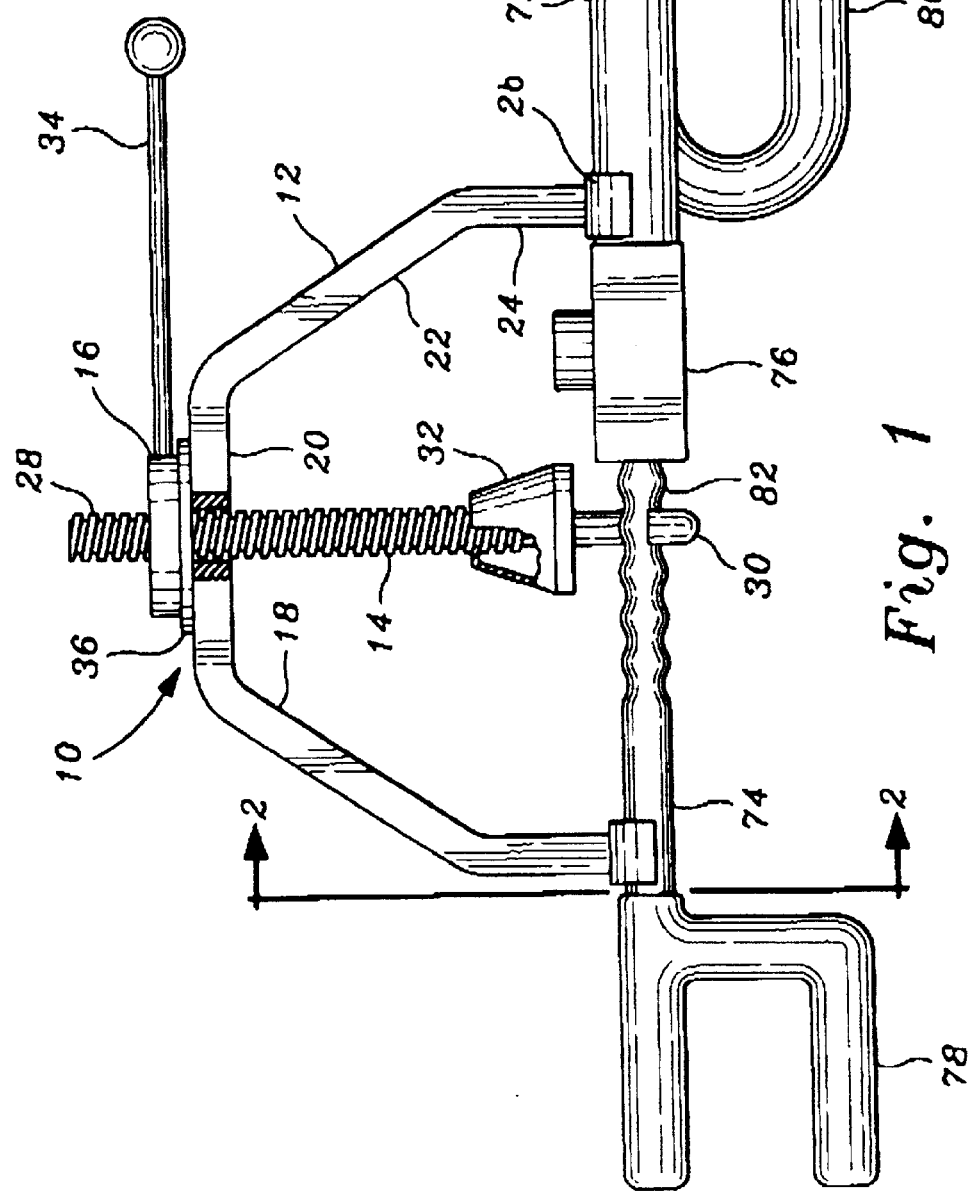

STEERING WHEEL LOCK REMOVING METHOD

CROSS REFERENCES AND RELATED SUBJECT MATTER

The invention relates to subject to subject matter contained in U.S. patent application Ser. No. 09/002,453, filed in the United States Patent Office on Jan. 2, 1998.

BACKGROUND OF THE INVENTION

This invention relates to a steering wheel lock removing method. More particularly, the invention relates to a method using a device which employs a main body, a central shaft extending through the main body, and a crank arm rotatably mounted to the central shaft, designed for forcibly removing an automobile steering wheel lock from the steering wheel in a relatively quick and easy manner.

Automobile steering wheel locks are often used by car owners for preventing their vehicles from being stolen. Conventional automobile steering wheel locks including "THE CLUB" sold by Winner International, comprise an elongated tube, an elongated shaft slidably mounted within the tube, and a lock for selectively preventing the elongated shaft from sliding with respect to the elongated tube. A hook is formed on the remote end of the tube as well as the shaft for securing the elongated members on the steering wheel.

When properly secured on a steering wheel, the steering wheel lock is highly effective in preventing theft of the automobile. However, it may also prevent authorized operation of the vehicle when the key to the steering wheel lock is not readily available. Because the steering wheel lock is extremely difficult to remove without having a proper key to unlock it, the vehicle owner must hire a locksmith for its removal.

Existing methods of removing steering wheel locks often used by locksmiths include sawing through the steering wheel lock. This method not only consumes a lot of time but also generates sparks and flying particles during the sawing process, possibly causing damage to the interior of the automobile. In addition, this method requires a heavy power saw which is annoying and cumbersome to use since the power saw must be plugged into an electrical power supply.

Thus, it is desirable to have a device that is capable of removing a steering wheel lock from the steering wheel in a relatively quick and easy manner. Such a device should be capable of removing the steering wheel lock without damaging the interior of the automobile. Moreover, such a device should be capable of removing the steering wheel lock with minimal effort.

While these units mentioned above may be suitable for the particular purpose employed, or for general use, they would not be as suitable for the purposes of the present invention as disclosed hereafter.

SUMMARY OF THE INVENTION

It is an object of the invention to provide a steering wheel lock removing system which is simple to use, inexpensive to manufacture, and yet is capable of removing an automobile steering wheel locking apparatus from the steering wheel without damaging the interior of the automobile.

It is another object of the invention to provide a steering wheel lock removing system which enables the steering wheel lock to be removed from the steering wheel with a minimum of effort and minimal time consumption.

It is yet another object of the invention to provide a steering wheel lock removing system which is simple in construction so as to allow easy transportability.

The invention is a method for removing a steering wheel lock using a device having a main body having a center opening and a pair of supporting arms extending outwardly and downwardly. The device further comprises a central shaft extending through the center opening in the main body. The central shaft includes an externally threaded portion and a hook portion extending therefrom for grabbing the steering wheel lock. A crank arm having an internally threaded bore is rotatably mounted to the externally threaded portion of the central shaft. To remove a steering wheel lock from a steering wheel, the crank arm is manually rotated which advances the central shaft in an upward direction which in turn pulls at the grab point of the steering wheel lock while the supporting arms of the main body holds the remainder of the steering wheel lock in place, thereby bending the steering wheel lock. The steering wheel lock may be removed from the steering wheel when it either breaks, or is sufficiently bent to allow the hooks on the steering wheel lock to become disengaged from the rim of the steering wheel.

To the accomplishment of the above, and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a front elevational view of the device used according to the instant invention being properly secured to the steering wheel lock.

FIG. 2 is a cross-sectional view, taken on line 2—2 of FIG. 1 of the device employed with instant invention.

DETAILED DESCRIPTION OF THE PREFERRED EMBODIMENTS

Figure 4:
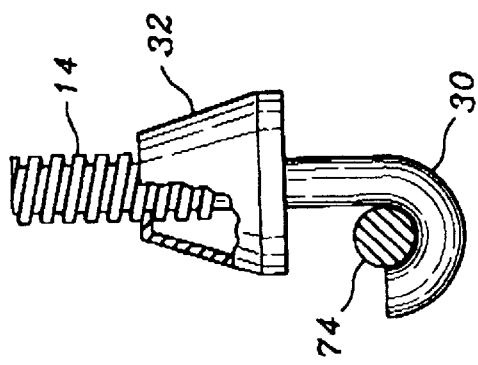
FIG. 4 is a cross-sectional view, taken on line 4—4 of FIG. 3 of the device of the instant invention.

FIG. 1 illustrates a steering wheel lock removing device 10 being properly secured to a steering wheel lock 70. For a better understanding of the present invention, the steering wheel lock 70 is illustrated consisting generally of an elongated tube 72, an elongated shaft 74 slidably mounted within the tube 72, and a lock 76 for selectively preventing the elongated shaft 74 from sliding with respect to the elongated tube 72. The steering wheel lock 70 further includes a first hook 78 formed on the remote end of the elongated shaft 74 and a second hook 80 formed on the elongated tube 72 for grabbing the rim of a steering wheel.

The steering wheel lock removing device 10 has primary components including a main body 12, a central shaft 14 extending through the main body 12, and a crank arm 16 rotatably mounted to the central shaft 14. The main body 12 includes a center opening for passage of the central shaft 14 and a pair of supporting arms 18 extending outwardly and downwardly. Each supporting arm 18 has a horizontal portion 20, inclined portion 22, vertical portion 24, and a cylinder receiving portion 26, depicted in FIG. 2, for holding the steering wheel lock 70 in place during its removal.

Figure 3:
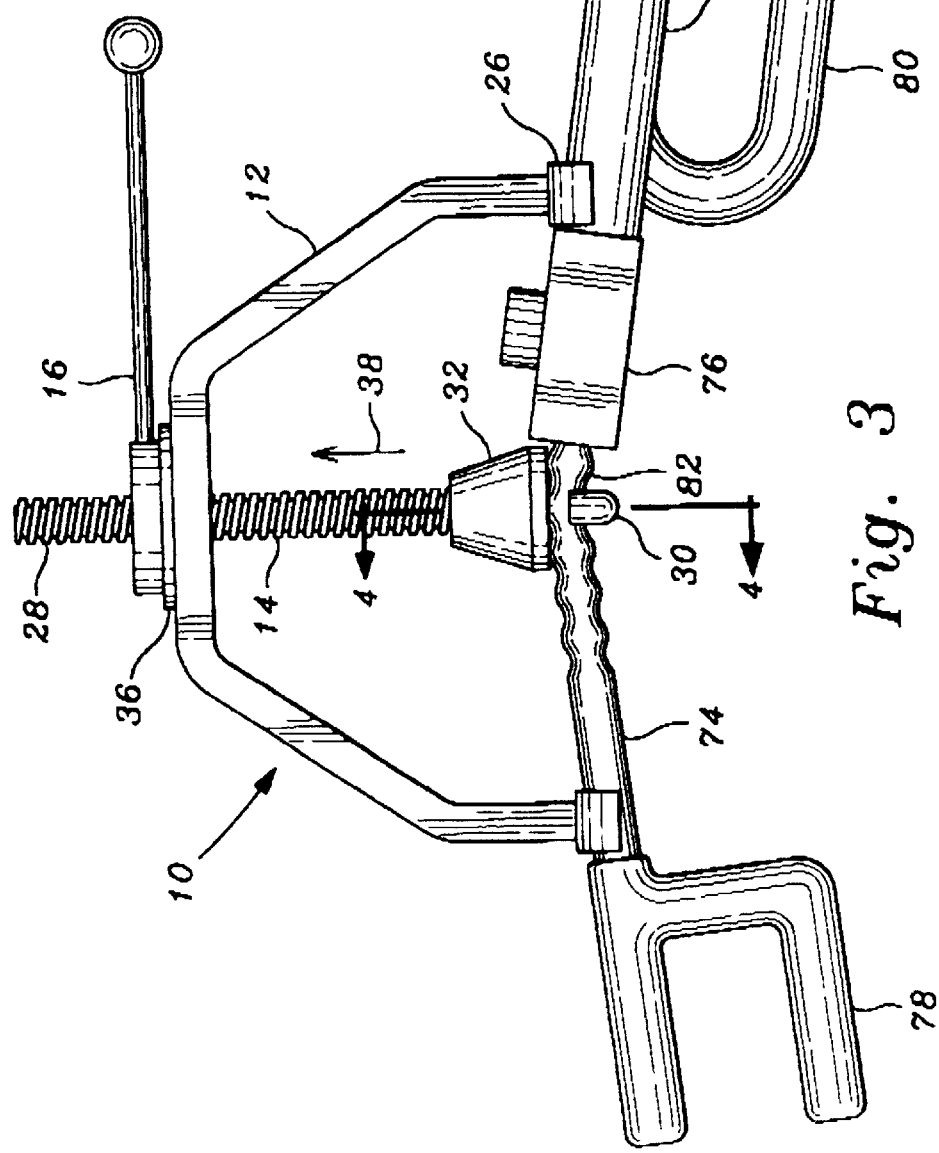
FIG. 3 is a front elevational view of the device of the instant invention illustrating the steering wheel lock bending as the central shaft is raised by the turning action of the crank arm.

FIG. 1 illustrates the central shaft 14 extending through the center opening in the main body 12. The central shaft 14 includes an externally threaded portion 28 and a hook portion 30, depicted in FIG. 4, extending therefrom for grabbing the steering wheel lock 70 between the supporting arms 18. The length of the central shaft 14 is greater than the overall height of the main body 12 such that the hook portion 30 of central shaft 14 is capable of extending below the main body 14 when the central shaft 11 is fully lowered. The steering wheel lock removing device 10 further comprises a shield cup 32 having a overall truncated conical shape and an internally threaded bore, which is rotatably mounted to the central shaft 14. FIG. 3 illustrates the shield cup 32 in lowered position designed for protecting the user during the removal of the steering wheel lock 70.

The crank arm 16 has an internally threaded bore and an elongated arm 34 protruding horizontally therefrom. The crank arm 16 is rotatably mounted to the externally threaded portion 28 of the central shaft 14 for advancing the central shaft 14 upward. A disc shaped seat 36 is radially mounted about the central shaft 14 and clamped between the crank arm 16 and the main body 12 for facilitating smooth rotation of the crank arm 16.

To secure the instant invention to the steering wheel lock 70, the central shaft 14 is fully lowered such that the hook portion 30 is extending below the cylinder receiving portions 26 of the main body 12. The hook portion 30 of the central shaft 14 is placed underneath the steering wheel lock 70 between the supporting arms 18 at a grab point 82, as depicted in FIGS. 1 and 4. Whereupon the shield cup 32 is lowered until the elongated shaft 74 of the steering wheel lock 70 is firmly clamped between the hook portion 30 and the shield cup 32, as depicted in FIG. 3. The central shaft 14 is then raised by rotating the crank arm 16 until the cylinder receiving portions 26 of the supporting arms 12 are placed at two contact points on the steering wheel lock 70, namely: on the elongated shaft 72 and on the elongated tube 74 of the steering wheel lock 70. The grab point 82 is between the two contact points.

After the steering wheel lock removing device 10 is properly secured to the steering wheel lock 70, the steering wheel lock 70 is ready to be removed. By turning the crank arm 16, the central shaft 14 advances in an upward direction 38 which in turn pulls at the grab point 82 of the steering wheel lock 70 while the main body 12 holds the remainder of the steering wheel lock 70 in place, thereby bending the steering wheel lock 70, as depicted in FIG. 3. The steering wheel lock 70 may be removed from the steering wheel when it either breaks, or is sufficiently bent to allow the first hook 78 and second hook 80 of the steering wheel lock 70 to become disengaged from the rim of the steering wheel. By turning the crank arm 16 in the opposite direction, the central shaft 14 is lowered, permitting removal of the bent steering wheel lock 70 from the steering wheel lock removing device 10.

While the embodiments of the present invention are disclosed in relation to conventional steering wheel locking devices including the device known as "THE CLUB," it will be appreciated by those skilled in the art that the steering wheel lock removing device 10 may be utilized in connection with other locking devices that are capable of being removed by bending a portion thereof.

Many specific details contained in the above description merely illustrate some preferred embodiments and should not be construed as a limitation on the scope of the invention. Many other variations are possible.

What is claimed is:

1. A lock removing method, for removing a steering wheel lock with a device comprising a main body having a pair of supporting arms, a central shaft movably mounted to the main body, said central shaft having a grabbing means, and a raising and lowering means for raising and lowering the central shaft with respect to the main body, comprising the steps of:

a) placing said supporting arms on the steering wheel lock so as to hold the steering wheel lock in place at two contact points on the steering wheel lock;

b) grabbing the steering wheel lock between the two contact points with said central shaft at a grab point; and c) raising said central shaft with respect to the main body while the supporting arms hold the remainder of the steering wheel lock in place.

2. The lock removing method as recited in claim 1, wherein the steering wheel lock further has an elongated tube and an elongated shaft slidably mounted within the elongated tube, and wherein the step of placing said support arms further comprises placing support arms on said elongated tube and on said elongated shaft of the steering wheel lock.

3. The lock removing method as recited in claim 2, wherein the central shaft further has an externally threaded portion and a hook portion extending therefrom, and wherein the step of grabbing the steering wheel lock further comprises placing said hook portion of the central shaft underneath the steering wheel lock between the two contact points at the grab point.

4. The lock removing method as recited in claim 3, wherein the device further comprises a crank arm having an internally threaded bore and an elongated arm, said crank arm rotatably mounted to the externally threaded portion of the central shaft, and wherein the step of raising the central shaft further comprises turning the crank arm so as to advance the central shaft in an upward direction which in turn pulls at the grab point of the steering wheel lock while the support arms holds the steering wheel lock in place at the two contact points, thereby bending the steering wheel lock.

5. The lock removing method as recited in claim 4, wherein the device further comprises a shield cup coaxially mounted on the central shaft, and wherein the step of raising the central shaft is precluded by lowering the shield cup toward the grab point for protecting the user during removal of the steering wheel lock.

* * * * *